(12) United States Patent
Lee

(10) Patent No.: US 12,153,772 B2
(45) Date of Patent: Nov. 26, 2024

(54) SCREEN DEVICE

(71) Applicant: MIRAENANOTECH CO., LTD., Cheongju-si (KR)

(72) Inventor: Bog Kyu Lee, Cheongju-si (KR)

(73) Assignee: MIRAENANOTECH CO., LTD. (KR)

( * ) Notice: Subject to any disclaimer, the term of this patent is extended or adjusted under 35 U.S.C. 154(b) by 1 day.

(21) Appl. No.: 17/789,778

(22) PCT Filed: Nov. 17, 2020

(86) PCT No.: PCT/KR2020/016171
§ 371 (c)(1),
(2) Date: Jun. 28, 2022

(87) PCT Pub. No.: WO2021/137425
PCT Pub. Date: Jul. 8, 2021

(65) Prior Publication Data
US 2023/0038087 A1   Feb. 9, 2023

(30) Foreign Application Priority Data

Dec. 31, 2019  (KR) .................. 10-2019-0179565

(51) Int. Cl.
*G06F 3/044*  (2006.01)
(52) U.S. Cl.
CPC .......... *G06F 3/0448* (2019.05); *G06F 3/0446* (2019.05); *G06F 2203/04107* (2013.01); *G06F 2203/04112* (2013.01)

(58) Field of Classification Search
CPC . G06F 2203/04103; G06F 2203/04107; G06F 2203/04112; G06F 3/0446; G06F 3/0448
See application file for complete search history.

(56) References Cited

U.S. PATENT DOCUMENTS 10,732,764 B1* 8/2020 Shanmugam ............ H01Q 1/44
2012/0188200 A1* 7/2012 Roziere ............ G06F 3/041661
345/174

(Continued)

FOREIGN PATENT DOCUMENTS

KR     20140010980 A    1/2014
KR     20140078563 A    6/2014

(Continued)

OTHER PUBLICATIONS

Written Opinion for PCT/KR2020/016171 mailed Jan. 29, 2021.

(Continued)

*Primary Examiner* — Hong Zhou
(74) *Attorney, Agent, or Firm* — Renaissance IP Law Group LLP

(57) ABSTRACT

The present inventive concept provides a screen device capable of avoiding the moire phenomenon and including an electrically conductive mesh pattern that is formed on a film-shaped transparent substrate so as to enable at least one of touch input and electromagnetic wave shielding, in which the mesh pattern consists of a plurality of irregular polygons arranged along an upper surface of the transparent substrate, a pitch value of each of the plurality of irregular polygons is included within a preset range, and pitch values of respective neighboring irregular polygons are different from each other.

6 Claims, 8 Drawing Sheets

(56) References Cited

U.S. PATENT DOCUMENTS

| | | | |
|---|---|---|---|
| 2012/0234663 A1* | 9/2012 | Hwang | G06F 3/0446 |
| | | | 200/600 |
| 2014/0022739 A1* | 1/2014 | Hwang | H05K 1/0274 |
| | | | 174/253 |
| 2014/0083742 A1 | 3/2014 | Gao et al. | |
| 2014/0216804 A1* | 8/2014 | Yang | H05K 9/0096 |
| | | | 174/268 |
| 2015/0177876 A1* | 6/2015 | Ishii | G06F 3/0445 |
| | | | 345/174 |
| 2016/0378260 A1 | 12/2016 | Weaver et al. | |
| 2017/0031482 A1* | 2/2017 | Yoshiki | G06F 3/0446 |
| 2017/0221196 A1* | 8/2017 | Yamaguchi | G06T 7/0004 |
| 2018/0341349 A1 | 11/2018 | Sunada | |
| 2020/0285348 A1* | 9/2020 | Nakayama | G06F 3/047 |

FOREIGN PATENT DOCUMENTS

| | | |
|---|---|---|
| KR | 20140108610 A | 9/2014 |
| KR | 20150143987 A | 12/2015 |
| KR | 20160147220 A | 12/2016 |
| KR | 20190044625 A | 4/2019 |
| KR | 20190062943 A | 6/2019 |

OTHER PUBLICATIONS

International Search Report for PCT/KR2020/016171 mailed Jan. 29, 2021.
European Extended Search Report for Application No. 20909688.2, mailed Dec. 22, 2023.

* cited by examiner (a)

| | COMPARATIVE EXAMPLE | EXAMPLE |
|---|---|---|
| MESH PATTERN | | |
| LIGHT TRANSMITTANCE | T < 84% | T > 84% |
| MOIRE INTERFERENCE FRINGE | ◯ | ✕ |

FIG. 6

| CLASSIFICATION | ELECTROMAGNETIC WAVE SHIELDING RATE (dB) | | | | | | | | |
|---|---|---|---|---|---|---|---|---|---|
| | 30Hz | 100Hz | 300Hz | 500Hz | 700Hz | 900Hz | 1.2GHz | 1.5GHz | Max(dB) |
| EXAMPLE | 18.9 | 23.0 | 31.0 | 35.0 | 37.8 | 39.5 | 41.8 | 41.6 | 42.5 |
| COMPARATIVE EXAMPLE | 11.9 | 19.3 | 27.1 | 29.8 | 31.7 | 31.5 | 32.4 | 31.9 | 32.9 |

SCREEN DEVICE

TECHNICAL FIELD

The present inventive concept relates to a screen device, and more particularly, to a screen device capable of avoiding a moire phenomenon.

BACKGROUND ART

The touch screen device is, for example, an input device provided to various display devices such as a plasma display panel (PDP), a liquid crystal display (LCD), a light emitting diode (LED), an organic light emitting diode (OLED), a micro LED, and an active matrix organic light emitting diode (AMOLED) and recognizes a user's touch as an input signal when the user touches the screen. The touch screen device is used as an input device for various operating systems in many industrial fields from small mobile devices to large consoles. A method of recognizing the user's touch by such a touch screen device includes a capacitance type method, a resistive film method, and an infrared sensing method, and among which the capacitance type method is the most common.

The capacitance type touch screen device may be manufactured, for example, by laminating two transparent substrates having a touch sensor on one surface thereof, or by forming a touch sensor on both surfaces of a single transparent substrate. The touch sensor provided in the capacitance type touch screen device is formed of thin metal conductive wires so as to detect a change in capacitance, and is formed in a mesh pattern so as to transmit light.

Meanwhile, conventionally, in order to avoid the moire phenomenon that occurs by mutual interference between the mesh pattern of the touch sensor and a pixel pattern of the display device, irregularity was imparted to thin conductive wires forming the mesh pattern. However, such a mesh pattern of the conventional touch sensor has a problem in that thin conductive wires are concentrated in an unspecified region due to excessive irregularity to form a foreign substance feeling, has a problem in that it is still difficult to avoid the moire phenomenon due to the foreign substance feeling, and has a problem in that visibility is lowered.

The technology underlying the present inventive concept is published in the following patent documents.
(Patent Document 1) KR10-2015-0143987 A
(Patent Document 2) KR10-2019-0044625 A

DISCLOSURE

Technical Problem

The present inventive concept provides a screen device capable of avoiding the moire phenomenon.

The present inventive concept provides a screen device capable of increasing an electromagnetic wave shielding effect.

Technical Solution

A screen device according to an embodiment of the present inventive concept is a light-transmitting screen device, the screen device comprising an electrically conductive mesh pattern that is formed on a film-shaped transparent substrate so as to enable at least one of touch input and electromagnetic wave shielding, the mesh pattern consists of a plurality of irregular polygons arranged along an upper surface of the transparent substrate, a pitch value of each of the plurality of irregular polygons is included within a preset range, and pitch values of respective neighboring irregular polygons are different from each other.

The number of vertices of the irregular polygon may be four or more, and directions in which respective sides of the irregular polygon extend may be different from each other.

In the irregular polygon, angles formed by neighboring sides around each vertex may be different from each other.

The pitch value of each of the plurality of irregular polygons may be determined such that a light transmittance of the mesh pattern is 80% or more and a sheet resistance of the mesh pattern is 10 $\Omega/cm^2$ or less.

Among the pitch values of the plurality of irregular polygons, a magnitude of a lower limit value may be 70% of a magnitude of a reference pitch value, and a magnitude of an upper limit value may be 130% of the magnitude of the reference pitch value.

The reference pitch value may be any one value selected from 100 to 500 micrometers.

When the reference pitch value is 350 micrometers, the pitch values of the plurality of irregular polygons may be distributed within a range of 245 to 455 micrometers.

When the reference pitch value is 400 micrometers, the pitch values of the plurality of irregular polygons may be distributed within a range of 280 to 520 micrometers.

When the reference pitch value is 450 micrometers, the pitch values of the plurality of irregular polygons may be distributed within a range of 315 to 585 micrometers.

When the reference pitch value is 500 micrometers, the pitch values of the plurality of irregular polygons may be distributed within a range of 350 to 650 micrometers.

A concave groove may be formed in a shape of the mesh pattern on the upper surface of the transparent substrate, and the mesh pattern may be formed along the groove.

The plurality of irregular polygons may comprise a plurality of mesh lines, and each of a width and a depth of the mesh line may be within a range of 4 to 10 micrometers.

The mesh pattern may comprise a plurality of unit mesh blocks arranged in an array form, and shapes and sizes of the irregular polygons forming a boundary between the unit mesh blocks at the outermost part of each of the plurality of unit mesh blocks may be different from each other.

The plurality of unit mesh blocks may have the same size.

The plurality of unit mesh blocks may have a size of 5 cm×5 cm or less, and may include a rectangular shape.

In the mesh pattern, a plurality of disconnection lines may be formed to separate and partition a plurality of channels each of which is capable of conducting electricity such that the plurality of channels are formed.

Advantageous Effects

According to an embodiment of the present inventive concept, by distributing the pitch values of the irregular polygons constituting the mesh pattern on the transparent substrate within a preset range, it is possible to prevent irregular polygons that are relatively large or small compared to the surroundings from occurring or agglomerating in an unspecified region of the mesh pattern, and it is possible to prevent an unspecified region in the mesh pattern from appearing more prominent than the surroundings. That is, it is possible to prevent a foreign substance feeling from occurring at a boundary line of the irregular polygons due to this size difference. From this, when the screen device is attached to a front surface of the display device and used as a touch screen device or an electromagnetic wave shielding device, it is possible to fundamentally prevent the moire phenomenon caused by the foreign substance feeling of the mesh pattern, and it is possible to avoid the moire phenomenon and improve visibility of the screen device by preventing a pixel pattern of the display device from interfering with the mesh pattern of the screen device at all angles regardless of the pixel pattern of the display device. In addition, it is possible to increase the electromagnetic wave shielding effect by preventing the irregular polygons from being concentrated at unspecified positions.

BRIEF DESCRIPTION OF THE DRAWINGS

FIGS. 5 to 7 are diagrams for illustrating characteristics of a screen device according to the comparative example and the example of the present inventive concept in comparison.

MODE FOR CARRYING OUT THE INVENTIVE CONCEPT

Figure 1:
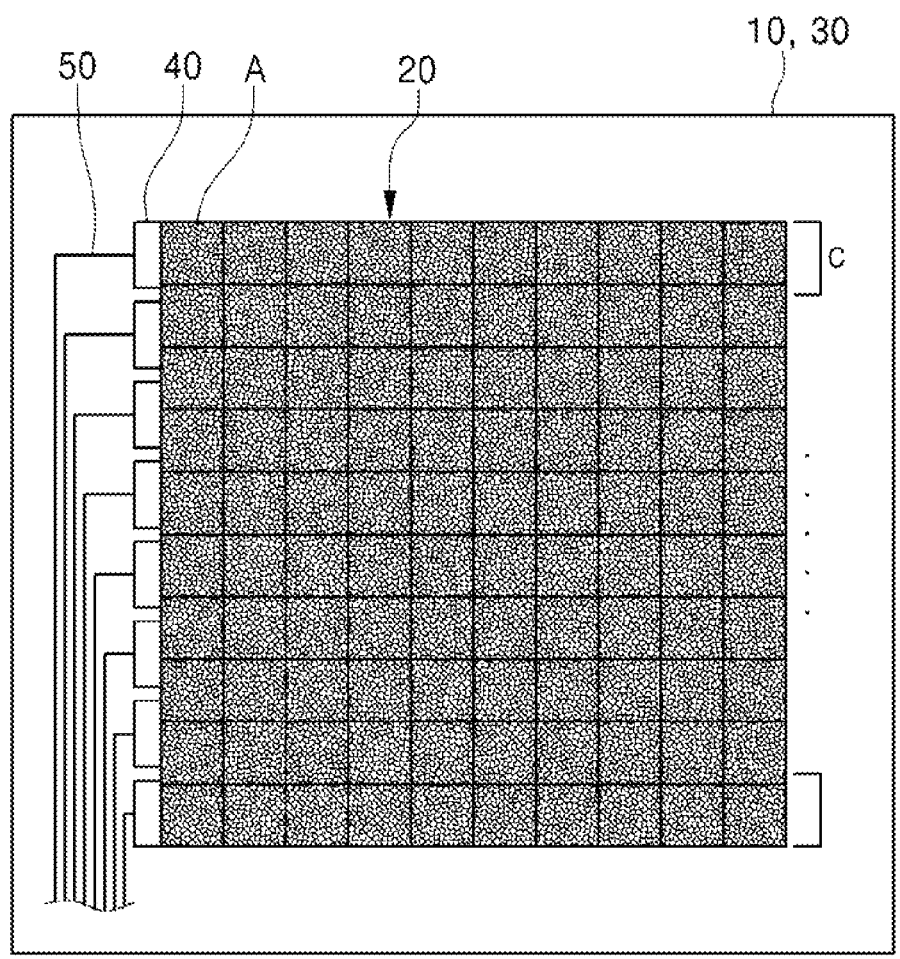
FIG. 1 is a schematic diagram of a screen device according to an example of the present inventive concept.

Hereinafter, specific examples will be described in detail with reference to the accompanying drawings. The present inventive concept may, however, be embodied in different forms and should not be construed as limited to the examples set forth herein. Rather, these examples are provided so that this disclosure will be thorough and complete, and will fully convey the scope of the present inventive concept to those skilled in the art. The drawings may be exaggerated in order to describe the example of the present inventive concept, and like reference numerals in the drawings refer to the same elements.

The screen device according to an example of the present inventive concept may be disposed on a front surface part of the display device, may be used variously as at least one device among the touch screen device and an electromagnetic wave shielding device, and may be used for a vehicle window or a building window. Hereinafter, the screen device according to an example of the present inventive concept will be described in detail.

Figure 2:
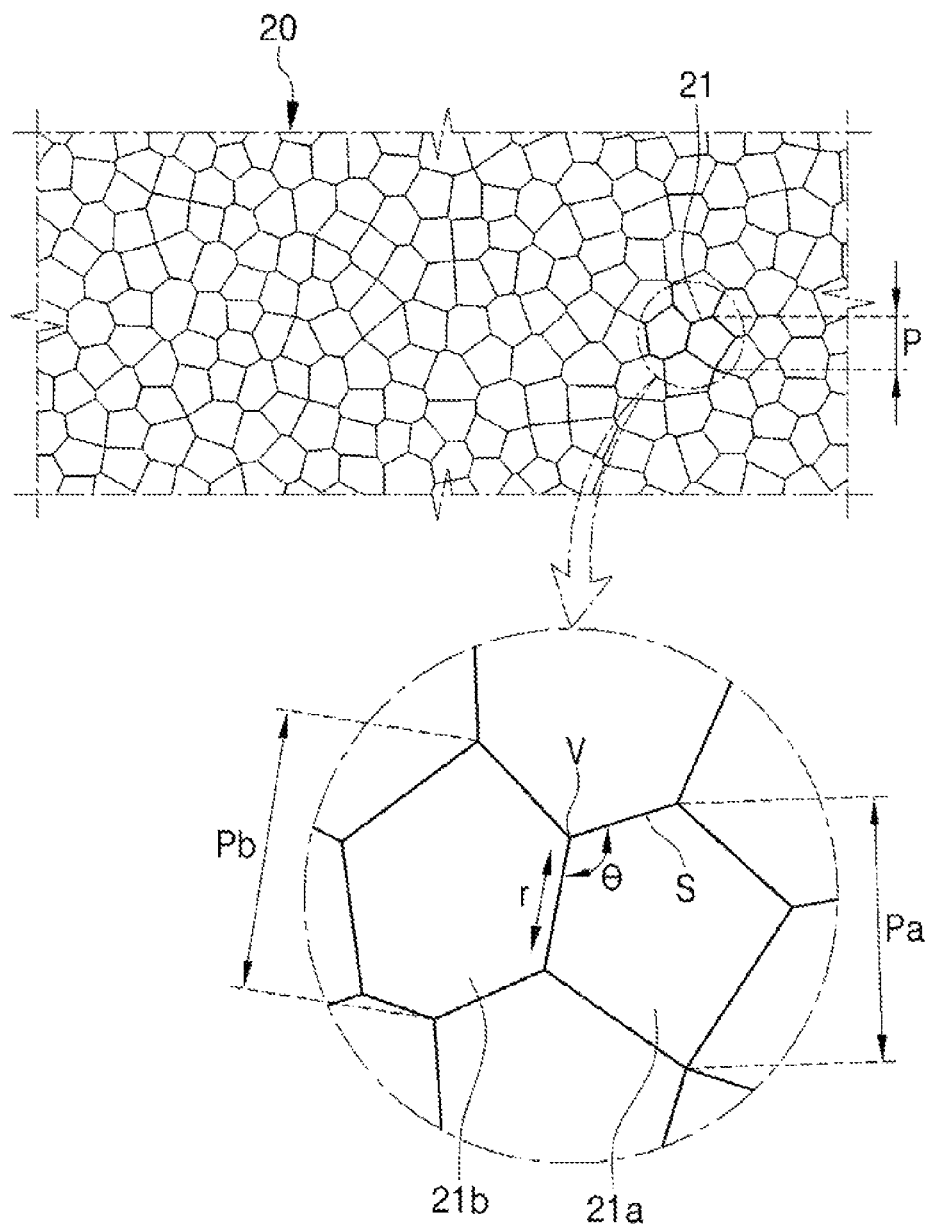
FIG. 2 is a schematic diagram of a mesh pattern according to an example of the present inventive concept.
Figure 3:
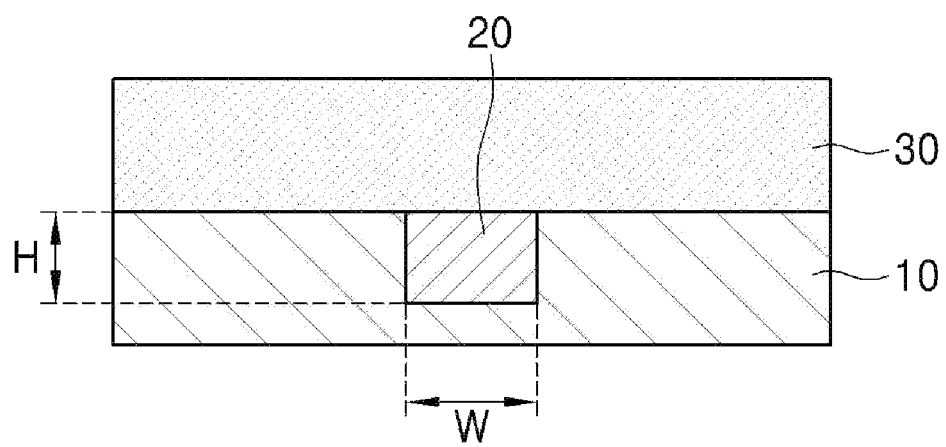
FIG. 3 is a partial cross-sectional view of the screen device according to an example of the present inventive concept.

FIG. 1 is a schematic diagram of the screen device according to an example of the present inventive concept, FIG. 2 is a schematic diagram of a mesh pattern according to an example of the present inventive concept, and FIG. 3 is a partial cross-sectional view of the screen device according to an example of the present inventive concept.

Referring to FIGS. 1 to 3, the screen device according to an example of the present inventive concept is a light-transmitting screen device, and includes an electrically conductive mesh pattern 20 formed on a film-shaped transparent substrate 10 so as to enable at least one of a touch input and electromagnetic wave shielding. In this case, the mesh pattern 20 consists of a plurality of irregular polygons 21 arranged along an upper surface of the transparent substrate 10. In addition, a pitch value P of each of the plurality of irregular polygons is included within a preset range, and pitch values of the respective neighboring irregular polygons are different from each other. In addition, the screen device described above may include the transparent substrate 10, a protective substrate 30, a connector 40, and a peripheral wiring 50. The screen device may be provided with a plurality of sets, for example, two sets, of the transparent substrate 10, the mesh pattern 20, the protective substrate 30, the connector 40, and the peripheral wiring 50, and these sets may be stacked vertically and laminated together.

Referring to FIG. 1, the transparent substrate 10 serves as a base material. The transparent substrate 10 may be, for example, a base film or a base material layer. The transparent substrate 10 may be formed in a film shape. Specifically, the transparent substrate 10 may be formed in a rectangular film shape. Of course, the transparent substrate 10 may be formed in various shapes. A lower surface of the transparent substrate 10 may be stacked on a panel of the display device. The mesh pattern 20, the connector 40, and the peripheral wiring 50 may be formed on the upper surface of the transparent substrate 10, and the upper surface thereof may be protected by the protective substrate 30. An upper surface of the protective substrate 30 may be protected with a glass substrate (not illustrated).

An area of the transparent substrate 10 may be larger than a screen area of the display device to which the screen device is to be applied, or may be the same as the screen area described above. A thickness of the transparent substrate 10 may be greater than 10 micrometers and less than or equal to 250 micrometers. In this case, if the thickness of the transparent substrate 10 is 10 micrometers or less, it may be difficult to form the mesh pattern 20 on the transparent substrate 10 to a desired thickness. And when the thickness of the transparent substrate 10 is more than 250 micrometers, the luminance of the screen device may be lower than the desired luminance. The transparent substrate 10 may include various resin materials that can be manufactured in the form of a film. For example, the transparent substrate 10 may contain a polyethylene terephthalate (PET) material. Of course, the transparent substrate 10 may contain various materials such as a polyethylene naphthalate (PEN) material, a polyimide (PI) material, a polycarbonate (PC) material, and a polymethyl methacrylate (PMMA) material. The transparent substrate 10 may have a light transmittance of, for example, 80% or more. On the other hand, as for the light transmitting property, the closer to 100%, the better the light transmittance, and the closer to 0%, the worse the light transmittance.

Referring to FIGS. 2 and 3, the mesh pattern 20 serves as a touch sensor. The mesh pattern 20 may be referred to as, for example, a pattern electrode, a detection electrode, a sensor layer, or an electrode layer. In order to form the mesh pattern 20 on the upper surface of the transparent substrate 10, a concave groove may be formed in the shape of the mesh pattern 20 on the upper surface of the transparent substrate 10 and the mesh pattern 20 may be formed along the groove. That is, the mesh pattern 20 may be formed by filling a conductive substance in an intaglio of the upper surface of the transparent substrate 10. In this case, the transparent substrate 10 may contain a plastic resin material, and after filling a substance of a metal material having electrical conductivity in the groove formed on the transparent substrate 10 using a blade, heat can be applied to form the mesh pattern 20. Thereafter, foreign substances may be removed by shaving the surface of the mesh pattern 20 to a predetermined thickness. Although an intaglio carving electrode method in which the mesh pattern 20 described above is formed by filling the conductive material in the intaglio of the transparent substrate 10 has been described as an example, but differently from this, an embossed carving electrode method in which the mesh pattern 20 is formed to protrude from the upper surface of the transparent substrate 10 to a predetermined thickness is also applicable.

The mesh pattern 20 may contain, for example, a metal material having electrical conductivity. Specifically, the mesh pattern 20 may contain a silver material. Of course, the material of the mesh pattern 20 may be various, including copper, aluminum, nickel, and chromium material.

The mesh pattern 20 may include a plurality of mesh lines. A plurality of mesh lines may form a plurality of irregular polygons 21 by intersecting each other in various directions. That is, each side of the plurality of irregular polygons 21 may be formed by a mesh line. Meanwhile, the mesh line may be referred to as a thin conductive wire.

A width and depth (thickness) of the mesh line will be described based on the case in which the mesh line is formed by the intaglio carving electrode method for filling the conductive material in the intaglio of the transparent substrate 10. A width W of each mesh line may be 4 to 10 micrometers. In addition, a depth H of each mesh line may be 4 to 10 micrometers. A cross-sectional shape of the mesh line may be a rectangular shape. If the width W and depth H of the mesh line is less than 4 micrometers, respectively, it may be difficult to manufacture the mesh pattern 20. If the width W and the depth H of the mesh line are greater than 10 micrometers, respectively, the light transmittance of the mesh pattern 20 may be affected, and screen visibility of the display device to which the screen device is applied may be lowered. On the other hand, as each of the width W and depth H of the mesh line is closer to 4 micrometers, the light transmittance of the mesh pattern 20 is improved, and as each of the width W and depth H of the mesh line is closer to 10 micrometers, a change in capacitance due to a user's touch can be accurately detected.

In the case of forming the mesh line by the embossed carving electrode method, which is a method of forming the mesh line to be protruded from the upper surface of the transparent substrate 10, when describing the width and thickness of the mesh line, the width of the mesh line may be 0.5 to 10 micrometers, and the thickness may be 0.2 to 5 micrometers. The cross-sectional shape of such a mesh line may be a rectangular shape. In this case, the embossed carving electrode method can be manufactured by a photo process and an etching process, and thus, it is possible to implement a finer mesh line width and thickness.

A plurality of irregular polygons 21 are arranged along the upper surface of the transparent substrate 10, and form the mesh pattern 20. That is, the mesh pattern 20 may include the plurality of irregular polygons 21 formed by intersecting irregular thin conductive wires. Here, the irregular means a non-regular shape. That is, the irregular may be a non-regular shape in which the shape is determined to be a predetermined shape, but a pattern that is regularly repeated cannot be derived from the predetermined shape. Accordingly, the plurality of irregular polygons 21 may have different shapes. The pitch value of each of the plurality of irregular polygons may be included within a preset range, and pitch values of respective neighboring irregular polygons may be different from each other. The pitch value means the maximum value among distance values between vertices v of the irregular polygon 21.

A region on the transparent substrate 10 on which the mesh pattern 20 is formed may be a channel region, a touch region, or an active region, and the remaining region may be a peripheral region. The channel region may include a plurality of channel sections c. The mesh pattern 20 formed in each channel section c may be electrically insulated from the mesh pattern 20 in an adjacent channel section c by a disconnection or the like. That is, in the mesh pattern 20, a plurality of disconnection lines may be formed to separate and partition a plurality of channels each of which is capable of conducting electricity in a predetermined direction such that the plurality of channels are formed. The disconnected line means a disconnected portion at the outer periphery of each channel. Meanwhile, the shape and arrangement of the channel section c may vary.

The protective substrate 30 may be formed to cover the upper surfaces of the transparent substrate 10 and the mesh pattern 20. The protective substrate 30 may have a film shape. The protective substrate 30 may contain an optical clear adhesive (OCA) material and may be optically transparent. The protective substrate 30 may be referred to as a protective sheet, an adhesive sheet, or an adhesive film.

The connector 40 and the peripheral wiring 50 may be formed in the peripheral region on the transparent substrate 10. The connector 40 may be electrically connected to the mesh pattern 20, and the peripheral wiring 50 may connect the connector 40 to an external circuit (not illustrated). A touch signal sensed by the mesh pattern 20 may be transmitted to an external circuit through the connector 40. The connector 40 and the peripheral wiring 50 described above may contain at least one of an indium tin oxide (ITO) film material, a copper material and a silver material.

Hereinafter, a plurality of irregular polygons 21 provided in the mesh pattern 20 according to an example of the present inventive concept will be described in detail with reference to FIG. 2.

The plurality of irregular polygons 21 may each have four or more vertices V. For example, the irregular polygon 21 may be a polygon having a quadrangle or more among polygons. For example, when comparing an irregular polygon of a triangle and an irregular polygon of a rectangle or more having the same pitch value, since the irregular polygon of a triangle has a smaller area than the irregular polygon of a rectangle or more and the irregular polygon of a triangle does not have a sufficient size compared to a pixel area of the display device, the pixel and the irregular polygon of a triangle may optically interfere with each other. When the irregular polygon 21 is formed of a polygon of a quadrangle or more, since the area thereof is larger compared to the same pixel value, optical interference between the irregular polygon 21 and the pixel can be suppressed or prevented.

The irregular polygon 21 may have various shapes, such as a quadrangle, a pentagon, and a hexagon. Hereinafter, an example of the present inventive concept will be described in detail with reference to the irregular polygon 21 of a pentagon.

For example, the irregular polygon 21 formed to have five vertices V and five sides S may include a first vertex, a second vertex, a third vertex, a fourth vertex, and a fifth vertex, and a first side, a second side, a third side, a fourth side, and a fifth side. The directions in which the respective sides S of the irregular polygon 21 extends may be different from each other. That is, a first direction in which the first side is extended, a second direction in which the second side is extended, a third direction in which the third side is extended, a fourth direction in which the fourth side is extended, and a fifth direction in which the fifth side is extended may be different directions. In addition, in the irregular polygon 21, angles θ formed by the neighboring sides S around each vertex V may be different from each other. Accordingly, it is possible to fundamentally prevent the boundary line between the irregular polygons 21 from forming a constant pattern and appearing more conspicuously than the surroundings. For example, when the irregularity of the irregular polygons 21 is excessive, a foreign substance feeling may rather occur on the mesh pattern 20, but the foreign substance can be fundamentally prevented in the typical polygons 21 according to an example of the present inventive concept.

Meanwhile, in the irregular polygon 21, distance values between vertices r may be different from each other within a predetermined magnitude range. The distance value between the first vertex and the second vertex, the distance value between the second vertex and the third vertex, the distance value between the third vertex and the fourth vertex, the distance value between the fourth vertex and the fifth vertex, and the distance value between the fifth vertex and the first vertex may be all included within a predetermined magnitude range and may be different from each other. Accordingly, it is possible to prevent each irregular polygon 21 from being prominently deformed in shape compared to the surrounding, and it is possible to suppress or prevent the unspecified irregular polygon 21 from being conspicuous compared to the surroundings. The shapes of the irregular polygons 21 adjacent to each other of the plurality of irregular polygons 21 formed as described above may be different from each other. Specifically, the of shapes the first irregular polygon 21a and the second irregular polygon 21b adjacent to each other may be different from each other. In this case, the pitch value Pa of the first irregular polygon 21a and the pitch value Pb of the second irregular polygon 21b may also be different from each other.

In the plurality of irregular polygons 21, each pitch value P may be determined according to light transmittance and sheet resistance of the mesh pattern 20. Specifically, the pitch value of each of the plurality of irregular polygons 21 may be determined such that the light transmittance of the mesh pattern is 80% or more and the sheet resistance of the mesh pattern is 10 Ω/cm² or less. For example, the lower limit of the pitch value of the irregular polygon 21 may be any one value selected from among the values the light transmittance of the mesh pattern 20 is 80% or more, and the upper limit of the pitch value of the irregular polygon 21 may be any one value selected from among the values such that the sheet resistance of the mesh pattern 20 is 10 Ω/cm² or less. Here, the upper limit of the light transmittance of the mesh pattern 20 may be less than 100%, and the lower limit of the sheet resistance of the mesh pattern 20 may be 0.1 Ω/cm² or more. As described above, the lower limit and upper limit of the pitch value P of the irregular polygon 21 may be selected within a range of 70 to 650 micrometers.

Meanwhile, the magnitude of the lower limit value among the pitch values P of the plurality of irregular polygons 21 may be 70% of the magnitude of the reference pitch value, and the magnitude of the upper limit value thereof may be 130% of the magnitude of the reference pitch value. That is, the upper limit value and the lower limit value of the plurality of irregular polygons 21 may be determined based on a predetermined magnitude of a reference pitch value, and thus the plurality of irregular polygons 21 may have a deviation of ±30% with respect to the reference pitch value. Specifically, the minimum pitch value may have a deviation of −30% and the maximum pitch value may have a deviation of +30% with respect to the reference pitch value. That is, the upper limit and lower limit of the pitch values of the plurality of irregular polygons 21 may be determined by the reference pitch value. That is, the reference pitch value means a pitch value serving as a reference for determining the upper limit and lower limit of the pitch value.

For example, among the pitch values of the plurality of irregular polygons 21, the minimum pitch value may be 0.7 times the reference pitch value, and the maximum pitch value may be 1.3 times the reference pitch value. Accordingly, it is possible to prevent each of the irregular polygons 21 from being prominent in size compared to the surroundings, and to suppress or prevent an unspecified irregular polygon 21 from being conspicuous compared to the surroundings.

That is, if the deviation of the upper limit value and the lower limit value with respect to the reference pitch value exceeds the deviation described above, when the irregular polygon having the minimum pitch value and the irregular polygon having the maximum pitch value are adjacent to each other, the boundary between the irregular polygons appears more prominent than the surroundings due to the difference in size thereof, and the foreign substance feeling may occur. In contrast, if the deviation of the upper limit value and the lower limit value with respect to the reference pitch value is within the range described above, even if the irregular polygon having the minimum pitch value and the irregular polygon having the maximum pitch value are adjacent to each other, the boundary may not be conspicuous compared to the surroundings, and it is possible to prevent the foreign substance feeling from occurring.

The magnitude of the reference pitch value may be, for example, determined to be the same as or similar to the pixel size of the display device to which the screen device is to be applied within a range of a predetermined pitch value for enabling the minimum pitch value and the maximum pitch value determined by the reference pitch value to be included within the magnitude range of the pitch value P such that the light transmittance of the mesh pattern 20 to be 80% or more and the sheet resistance of the mesh pattern 20 to be 10 Ω/cm² or less. When the light transmittance of the mesh pattern 20 is less than 80%, it is difficult to accurately visually recognize a screen output from the display device disposed under the mesh pattern 20. When the sheet resistance of the mesh pattern 20 exceeds 10 Ω/cm², the touch recognition sensitivity of the mesh pattern 20 may be lowered.

The reference pitch value described above may be any one value selected from 100 to 500 micrometers. In this case, if the magnitude of the reference pitch value is less than 100 micrometers, the magnitude of the minimum pitch value may be less than 70 micrometers, and due to the irregular polygons having the minimum pitch value, the light transmittance of the mesh pattern 20 may be lowered to less than 80%. If the magnitude of the reference pitch value is greater than 500 micrometers, the magnitude of the maximum pitch value exceeds 650 micrometers, and due to the irregular polygons having the maximum pitch value, the sheet resistance of the mesh pattern 20 may be greater than 10 Ω/cm². On the other hand, as the pitch value P of the irregular polygon 21 increases, the light transmitting property of the mesh pattern 20 may be improved. In addition, as the pitch value P of the irregular polygon 21 decreases, the sheet resistance of the mesh pattern 20 may be decreased.

Therefore, in the irregular polygon 21, the magnitude of the reference pitch value and the range of the pitch values P by the magnitude of the reference pitch value may be determined as described above in accordance with the light transmittance and sheet resistance required for the mesh pattern 20, and the light transmittance and sheet resistance of the mesh pattern 20 including the irregular polygons 21 may be maintained at a desired high level. On the other hand, if the light transmitting property of the mesh pattern 20 deteriorates, it is difficult for the screen device to accurately recognize the screen output from the display device, and if the sheet resistance of the mesh pattern 20 increases, the recognition sensitivity of the touch may be lowered.

As described above, if a size of an unspecified part of the irregular polygons 21 constituting the mesh pattern 20 is relatively larger or smaller than its periphery, the corresponding part may appear more prominently than its periphery. Accordingly, the range of the pitch value P of the irregular polygons 21 according to an example of the present inventive concept will be specifically exemplified as follows.

Example 1

The lower limit of the pitch value P of the irregular polygon 21 is 70 micrometers, and the upper limit thereof is 130 micrometers, and in this case, the reference pitch value may be 100 micrometers. The shape or size of each irregular polygon 21 may be determined within the range of the pitch value P. Accordingly, the plurality of irregular polygons 21 may have pitch values P of different magnitudes within the range of the pitch value P of 70 to 130 micrometers. From this, it is possible to fundamentally prevent a predetermined shape having a specific regularity from being formed in the mesh pattern 20 while preventing the irregularity of the irregular polygons 21 from becoming excessive.

Example 2

The lower limit of the pitch values P of the plurality of irregular polygons 21 is 140 micrometers, and the upper limit thereof is 260 micrometers, and in this case, the reference pitch value may be 200 micrometers. The shape or size of each irregular polygon 21 may be determined within the range of the pitch value P. That is, the plurality of irregular polygons 21 constituting the mesh pattern 20 may have the pitch values P of different magnitudes within the range of the pitch value P of 140 to 260 micrometers.

Example 3

The lower limit of the pitch value P of the irregular polygon 21 is 210 micrometers, and the upper limit thereof is 390 micrometers, and in this case, the reference pitch value may be 300 micrometers. The shape or size of each irregular polygon 21 may be determined within the range of the pitch value P. That is, the plurality of irregular polygons 21 constituting the mesh pattern 20 may have pitch values P of different magnitudes within the range of the pitch value P of 210 to 390 micrometers.

Example 4

The lower limit of the pitch value P of the irregular polygon 21 is 245 micrometers, and the upper limit thereof is 455 micrometers, and in this case, the reference pitch value may be 350 micrometers. That is, the plurality of irregular polygons 21 constituting the mesh pattern 20 may have pitch values P of different magnitudes within the range of the pitch value P of 245 to 455 micrometers. If the range of the pitch value P of the plurality of irregular polygons 21 exceeds the range described above, when an irregular polygon having a pitch value P of less than 245 micrometers and an irregular polygon having a pitch value P greater than 455 micrometers are adjacent to each other, a foreign substance feeling may occur in the mesh pattern 20 due to the difference in their size.

Example 5

The lower limit of the pitch value P of the irregular polygon 21 is 280 micrometers, and the upper limit thereof is 520 micrometers, and in this case, the reference pitch value may be 400 micrometers. The shape or size of each irregular polygon 21 may be determined within the range of the pitch value P. That is, the plurality of irregular polygons 21 constituting the mesh pattern 20 may have pitch values P of different magnitudes within the range of the pitch value P of 280 to 520 micrometers. If the range of the pitch value P of the plurality of irregular polygons 21 exceeds the range described above, when an irregular polygon having the pitch value P of less than 280 micrometers and an irregular polygon having the pitch value P greater than 520 micrometers are adjacent to each other, the foreign substance feeling may occur in the mesh pattern 20 due to the difference in their size.

Example 6

The lower limit of the pitch value P of the irregular polygon 21 is 315 micrometers, and the upper limit thereof is 585 micrometers, and in this case, the reference pitch value may be 450 micrometers. That is, the plurality of irregular polygons 21 constituting the mesh pattern 20 may have the pitch values P of different magnitudes within the range of the pitch value P of 315 to 585 micrometers. If the range of the pitch value P of the plurality of irregular polygons 21 exceeds the range described above, the foreign substance feeling may occur in the mesh pattern 20.

Example 7

The lower limit of the pitch value P of the irregular polygon 21 is 350 micrometers, and the upper limit thereof is 650 micrometers, and in this case, the reference pitch value may be 500 micrometers. The shape or size of each irregular polygon 21 may be determined within the range of the pitch value P. That is, the plurality of irregular polygons 21 constituting the mesh pattern 20 may have pitch values P of different magnitudes within the range of the pitch value P of 350 to 650 micrometers. If the range of the pitch value P of the plurality of irregular polygons 21 exceeds the range described above, the foreign substance feeling may occur in the mesh pattern 20.

As such, the reference pitch value may be a value selected from 100 to 500 micrometers, the range of the pitch value P of the plurality of irregular polygons 21 may be determined as described above according to the reference pitch value. The reason lies in the electrical and optical properties of the touch screen device formed of meshes. The touch screen device is positioned above the display device, and thus a transmittance of a certain value or more should be secured, and a low sheet resistance is required to realize high sensitivity when touched.

The transmittance and sheet resistance depend on the magnitude of the pitch value in the mesh, and in general, the magnitude of the pitch value of the mesh pattern 20, the magnitude of the transmittance, and the magnitude of the sheet resistance are proportional to each other. When the reference pitch value of the mesh pattern 20 is 100 micrometers, the transmittance has a value of about 80%, and the sheet resistance shows a value of about 1 ohm/sq. In addition, when the reference pitch value is 500 micrometers, the touch screen device has the transmittance of about 87% and the sheet resistance of about 7 ohm/sq. It can be confirmed from these contents that there is a gain in transmittance as the magnitude of the pitch value increases, but due to the increased sheet resistance value accordingly, the touch sensitivity may show a lower value compared to the mesh having a small pitch.

Also, by distributing the pitch value P of the irregular polygon 21 within a predetermined range in this way, it is possible to prevent the occurrence or agglomeration of irregular polygons 21, which are relatively large or small in size compared to their surroundings, from occurring or being agglomerated in an unspecified region of the mesh pattern 20, and it is possible to prevent an unspecified region in the mesh pattern 20 from appearing more prominent than the surroundings. That is, it is possible to prevent the foreign substance feeling from occurring at the boundary of the irregular polygons 21 due to the size difference. In this case, since the sheet resistance of the mesh pattern 20 decreases as the reference pitch value is closer to 100 micrometers, the touch sensitivity can be improved. Since the light transmittance increases as the reference pitch value is closer to 500 micrometers, the screen of the display device to which the screen device is applied may become brighter.

Meanwhile, the shape of the mesh pattern 20 formed as described above may be designed using, for example, a predetermined design program. In this case, designing the entire shape of the mesh pattern 20 at once with the predetermined design program described above causes a significant computational load. Accordingly, referring to FIG. 1, the mesh pattern 20 according to an example of the present inventive concept may include a plurality of unit mesh blocks A arranged in an array form.

That is, in the examples of the present inventive concept, one mesh pattern 20 that blocks the entire area of the mesh pattern 20 into unit mesh blocks A of the same size, designs the shape of the mesh pattern for the blocked unit mesh block A, and arranging the designed shapes in an array form, thereby capable of forming a shape of one mesh pattern 20 connected to each other. In this case, the size of the plurality of unit mesh blocks A may be determined according to, for example, the number of mesh objects in the block. Here, the number of mesh objects in the block is determined according to the number of meshes (polygons) in the block, and in this case, the appropriate number of objects is 40,000 to 250,000. If this number of objects is implemented as a block in a square shape, the block size can be up to a size of 5 cm×5 cm. Specifically, the block size can be a size of 1 cm×1 cm or more and 5 cm×5 cm or less. For example, the block size may be selected from among sizes of 1 cm×1 cm to 5 cm×5 cm. Of course, the size of the block may vary within the range of 5 cm×5 cm or less.

For the shape of these blocks, a square-shaped block in which the length of the side per area can be optimally set is used, but other types of rectangles can be used in addition to the square shape. The determination of appropriate number of objects and block sizes above was determined based on the computing power of a general design PC. If the above appropriate number is exceeded, a problem may occur in computation during design.

In this case, in order to prevent the boundary of the unit mesh block A from being visually recognized, the irregular polygons forming the boundary between the unit mesh blocks A at the outermost part of each of the plurality of unit mesh blocks A have different shapes and sizes. That is, in the plurality of unit mesh blocks A, the shape and size of the irregular polygons of the boundary line may be corrected.

Specifically, the shape and size of the irregular polygons 21 can be corrected so that the lengths and extension directions r of the sides S of the irregular polygons 21 positioned at the boundary of the unit mesh blocks A are different from each other. The shape of the irregular polygons 21 may be corrected so that angles θ formed by the sides S adjacent to each other around each vertex V are different. This correction is referred to as block boundary line correction. With this, it is possible to prevent the foreign substance feeling from occurring at the boundary of the unit mesh blocks A, and it is possible to naturally or smoothly arrange the respective unit mesh blocks A in an array form. That is, since it is difficult to design the entire shape of the mesh pattern 20 at once due to the computing power of the design PC, the shape of the unit mesh blocks A should be designed individually and then arranged in an array form to design them as one mesh pattern 20.

In this case, if block boundary line correction is not performed, although the pitch values of neighboring irregular polygons 21 within each unit mesh block A are different from each other, when viewing the boundary of the unit mesh blocks A, the pitch values of the neighboring irregular polygons 21 may be the same. Accordingly, the boundary of the unit mesh blocks A can be visually recognized.

In contrast, when designing the shape of each of the unit mesh blocks A and then arranging them in an array form to design the shape of one mesh pattern 20, if the block boundary line correction is performed, the pitch values of neighboring irregular polygons on the entire surface of the mesh pattern may be different from each other. Accordingly, it is possible to prevent the boundary of the unit mesh blocks A from being visually recognized.

Figure 4:
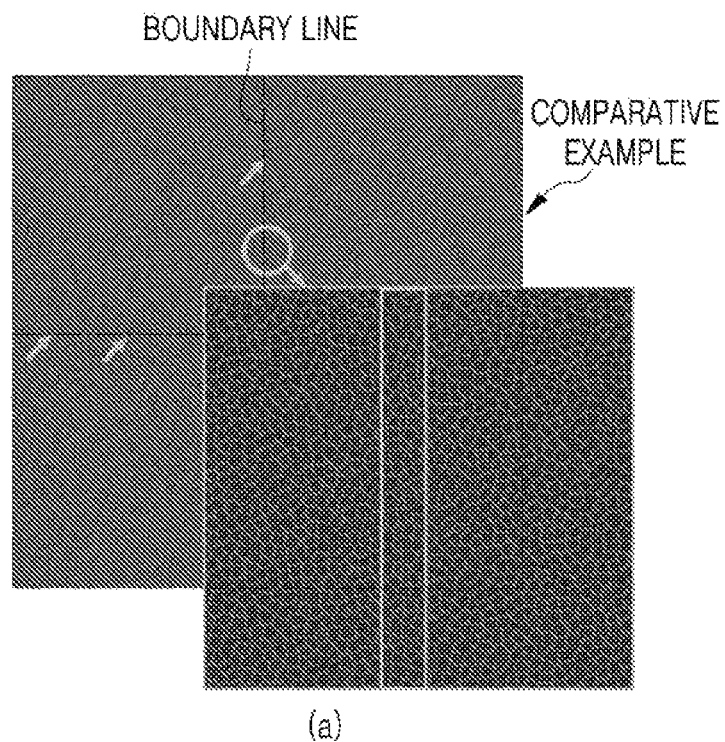
FIG. 4 is a photograph showing mesh patterns according to a comparative example and an example of the present inventive concept in comparison.
Figure 4:
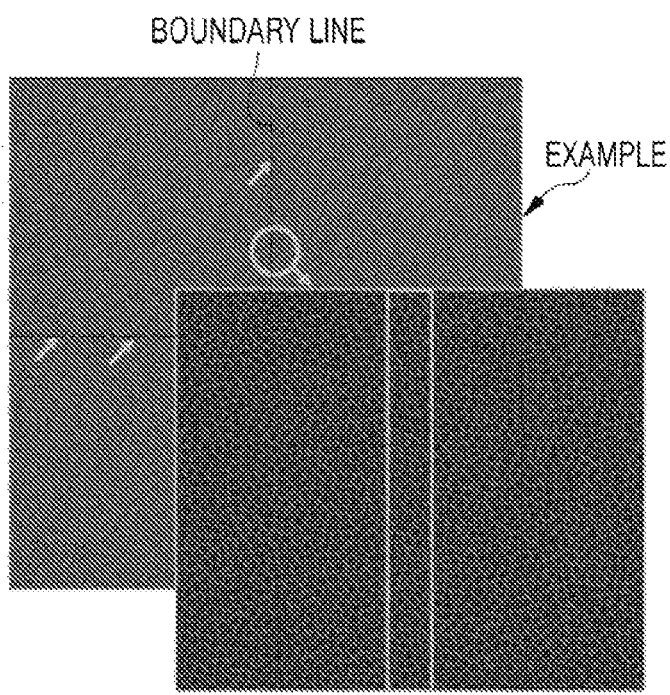

The (a) and (b) of FIG. 4 are photographs showing the mesh patterns according to a comparative example and an example of the present inventive concept in comparison. The (a) of FIG. 4 is a mesh pattern according to the comparative example of the present inventive concept, in the mesh pattern, the pitch value has a range of 70 to 130 micrometers, the line width and the depth of the mesh line are each 10 micrometers, and since the block boundary line is not corrected, the pitch values of at least some of the neighboring irregular polygons near the boundary of the unit mesh block are the same. When viewing the boundary of the mesh pattern according to the comparative example, it can be confirmed that irregular polygons having relatively small sizes are viewed as being agglomerated, and it can be seen that shadow having a linear shape is visually recognized on the mesh pattern due to the size difference.

In contrast, the (b) of FIG. 4 is a mesh pattern according to the example of the present inventive concept, and in the mesh pattern, the pitch value has a range of 70 to 130 micrometers, the line width and depth of the mesh line are each 10 micrometers, and since the block boundary line is corrected, the pitch values of the respective neighboring irregular polygons on the entire surface of the mesh pattern 20 are different from each other. As shown in the picture, the pitch values of the plurality of irregular polygons 21 have a deviation of ±30% with respect to the reference pitch value. Accordingly, it can be confirmed that the agglomeration of the irregular polygons due to the size difference does not occur as a whole in the mesh pattern, and the agglomeration described above does not occur even at the boundary between the blocks. That is, in the example of the present inventive concept, it can be seen that shadow having a linear shape is not formed on the mesh pattern. Meanwhile, the boundary line described above means a boundary line of the unit mesh block forming the mesh pattern.

Figure 7:
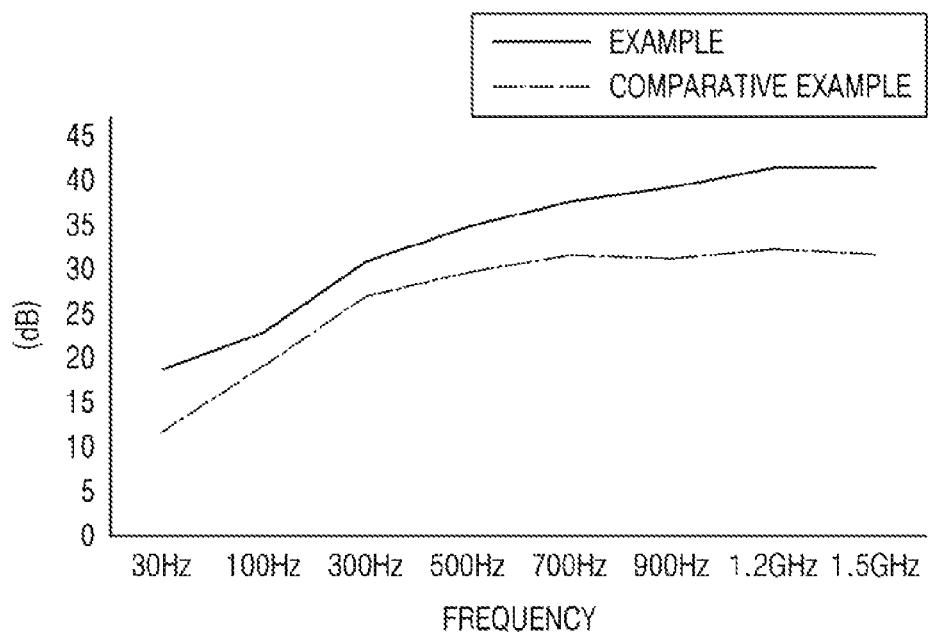

FIGS. 5 to 7 are diagrams for illustrating characteristics of a screen device according to a comparative example and an example of the present inventive concept in comparison. Specifically, FIG. 5 is a table illustrating the light transmittance of the screen device according to the comparative example and example of the present inventive concept in comparison, and FIG. 6 is a table illustrating the electromagnetic wave shielding rate of the screen device according to the comparative example and example of the present inventive concept in comparison, and FIG. 7 is a diagram illustrating the table of FIG. 6 as a graph. Here, the light transmittance is the transmittance with respect to the intensity of light passing through the screen device, and the larger the magnitude thereof, the better the light is transmitted.

The comparative example of FIG. 5 is a mesh pattern formed of irregular polygons of which upper limit and lower limit of the pitch value are not limited using the reference pitch value, and is a mesh pattern that includes irregular polygons in which the center value of the pitch value is 100 micrometers and the range of the pitch value is in a predetermined range out of 70 to 130 micrometers, and the line width and depth of the mesh line are each 10 micrometers. The example of FIG. 5 is a mesh pattern formed of irregular polygons of which the upper limit and lower limit of the pitch value are limited using the reference pitch value, and is a mesh pattern that includes irregular polygons in which the reference pitch value is 100 micrometers and a range of the pitch value is within a range of 70 to 130 micrometers, and a line width and depth of the mesh line are each 10 micrometers.

When comparing the light transmittance of the screen device including the mesh pattern according to the comparative example of FIG. 5 and the screen device including the mesh pattern according to the example, the light transmittance of the comparative example is less than 84%, and the light transmittance of the example is greater than 84%. That is, it can be seen that the light transmittance is larger in the case of the example. This means that the screen device of the example better transmits and displays the screen of the display device.

The reason for the difference in light transmittance between the comparative example and the example is that in the case of the comparative example, since the difference between the upper limit and lower limit of the pitch value is large, the irregular polygons with a relatively small pitch value appears more prominently than surroundings, and shadow occurs and is deepened in the corresponding portion, and the shadow and the pixel pattern of the display device interfere with each other to form a moire interference fringe. On the other hand, in the case of the example, the upper limit and lower limit of the pitch value are limited to have a deviation of ±30% from the reference pitch value, and as the pitch values are variously distributed within a limited range, it is possible to prevent excessive irregularity while eliminating the repetition of regular shapes in the mesh pattern, to fundamentally prevent the moire interference fringe due to size differences, and to improve visibility and to make better the visibility.

The example of FIG. 6 is a mesh pattern formed of irregular polygons of which the upper limit and lower limit of the pitch value are limited using the reference pitch value, and is a mesh pattern that includes irregular polygons in which the reference pitch value is 240 micrometers, a range of the pitch value is within a range of 168 to 312 micrometers, and a line width and depth of the mesh line are each 10 micrometers.

The comparative example of FIG. 6 is a mesh pattern formed of irregular polygons of which upper limit and lower limit of the pitch value are not limited using the reference pitch value, and is a mesh pattern that includes irregular polygons in which the center value of the pitch value is 200 micrometers and the range of the pitch value is in a predetermined range out of 140 to 260 micrometers, and the line width and depth of the mesh line are each 10 micrometers.

The electromagnetic wave shielding rate was measured in a frequency range of 30 Hz to 1.5 GHz using the screen device having the mesh pattern of the example and comparative example described above, and is illustrated in the table of FIG. 6. The Max(dB) column of the figure illustrates the largest value among the electromagnetic wave shielding rate values measured in each frequency range. In this case, the electromagnetic wave shielding rate means that a measurement unit thereof is a decibel, and the larger the magnitude, the better the electromagnetic wave shielding. In addition, although the central value of the pitch value of the comparative example is smaller than the reference pitch value of the example, it can be confirmed that the shielding rate of the example shows a higher value than the shielding rate of the comparative example.

Referring to FIGS. 6 and 7, it can be confirmed that the magnitude of the electromagnetic wave shielding rate of the screen device including the mesh pattern of the example is generally larger than that of the comparative example. That is, the mesh pattern of the example of the present inventive concept can shield electromagnetic waves better than the mesh pattern of the comparative example. This is because the mesh pattern of the example is limited so that the upper limit and lower limit of the pitch value have a deviation of ±30% from the reference pitch value, and thus it is possible to prevent irregular polygons having an excessively smaller size than the surroundings from being concentrated in an unspecified position.

According to the matters described above, it can be confirmed that the screen device including the mesh pattern of the example has greater light transmittance and greater electromagnetic wave shielding rate than those of the screen device including the mesh pattern of the comparative example. In addition, it can be confirmed that, in the screen device including the mesh pattern of the example, the moire interference fringe due to interference with the pixel pattern of the display device does not occur, but in the screen device including the mesh pattern of the comparative example, the moire interference fringe occurs due to the interference with the pixel pattern of the display device.

This is because the comparative examples have a large difference in the magnitude of the upper limit value and the lower limit value of the pitch value compared to the example, and accordingly, as the irregularity becomes excessive, the irregular polygons are concentrated at unspecified positions to thereby lower the light transmittance and electromagnetic wave shielding effect, and the moire interference fringe is formed by the occurrence of the substance feeling on the mesh pattern. In contrast, in the example, since the irregularity is not excessive, the moire phenomenon can be avoided and the electromagnetic wave shielding effect can be increased. Therefore, it can be seen that the mesh pattern 20 consisting of irregular polygons 21 according to the example of the present inventive concept can avoid the moire phenomenon, has good visibility, and has an excellent electromagnetic wave shielding effect. That is, it can be confirmed that the screen device according to the example has better optical characteristics and electromagnetic wave shielding performance than the screen device according to the comparative examples.

Figure 8:
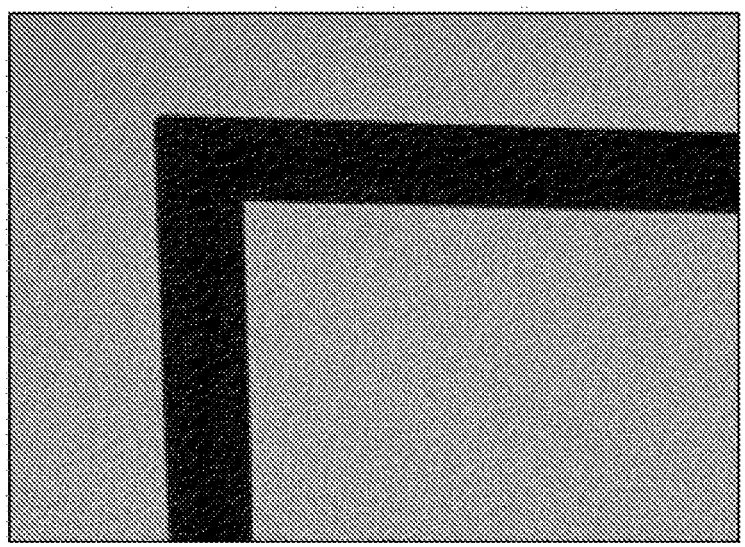
FIG. 8 is a photograph for illustrating whether or not a moire phenomenon occurs in the screen device according to an example of the present inventive concept.
Figure 9:
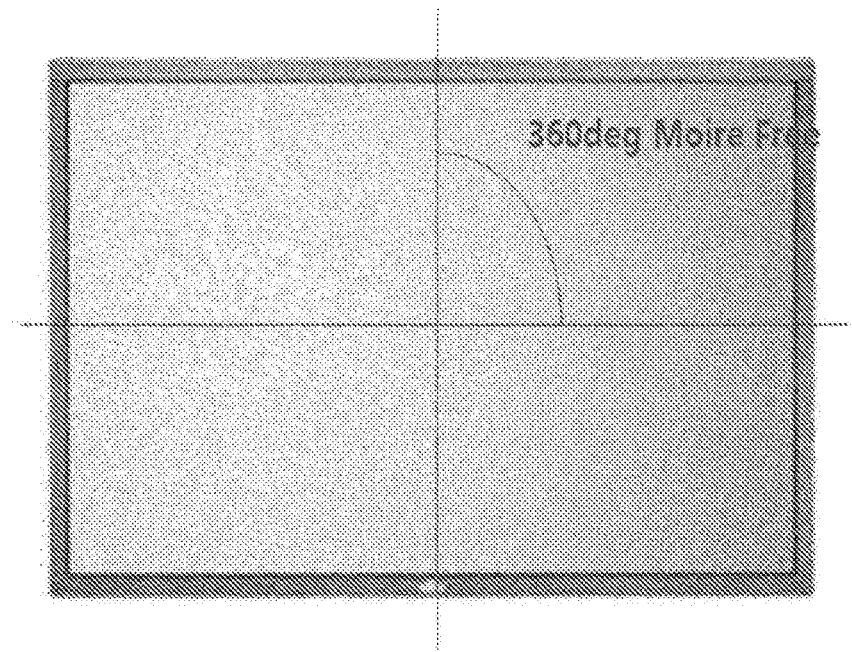
FIG. 9 is a photograph showing a display device to which the screen device according to an example of the present inventive concept is applied.

FIG. 8 is a photograph for illustrating whether or not the moire phenomenon occurs in the screen device according to the example of the present inventive concept, and FIG. 9 is a photograph showing a display device to which the screen device according to the example of the present inventive concept is applied. Here, the part visible in a dark black bar of FIG. 8 is a bezel part of the display device, and a light rectangular part inside the bezel is a screen part of the display device, and FIG. 8 is a photograph of the display device taken through the screen device according to the example of the present inventive concept.

In the comparative example, since irregular polygons may be concentrated and shadow may occur at irregular positions in the mesh pattern, the moire phenomenon may become severe depending on how the angle is determined on the display device. In contrast, in the case of the example, since it is possible to prevent the irregular polygons from being concentrated and to prevent shadow from occurring at irregular positions in the mesh pattern, even if the screen device is superimposed on the display as shown in FIG. 8, the moire interference fringe does not occur. Therefore, as illustrated in FIG. 9, in the example of the present inventive concept, even if the screen device is rotated in all directions 360 degrees, it can be confirmed that the moire phenomenon can be avoided in all directions and good visibility can be ensured.

According to the matters described above, in the example of the present inventive concept, since the plurality of irregular polygons 21 of the mesh pattern 20 have a polygonal shape having at least four or more sides and have different shapes from each other, the problem of boundary visibility from all angles of 360 degrees can be solved while satisfying the optical and electrical properties required for the screen device, and the moire phenomenon can be avoided. Accordingly, when the screen device is attached to the front surface of the display device and used as a touch screen device or an electromagnetic wave shielding device, it is possible to fundamentally prevent the moire phenomenon due to the foreign body feeling of the mesh pattern. In addition, the moire phenomenon can be avoided at all angles of 360 degrees by preventing the pixel pattern of the display device from interfering with the mesh pattern of the screen device at all angles regardless of the pixel pattern of the display device, and the visibility of the screen device can be improved.

The above examples of the present inventive concept are intended to illustrate the present inventive concept, not to limit the present inventive concept. It should be noted that the configurations and methods disclosed in the above examples of the present inventive concept may be combined and modified in various forms by being combined or cross-linked to each other, and modifications thereof may also be considered within the scope of the present inventive concept. That is, those skilled in the art to which the present inventive concept pertains will understand that the present inventive concept will be implemented in a variety of different forms within the scope of the claims and technical ideas equivalent to the claims, and various examples are possible within the scope of the technical ideas of the present inventive concept.

What is claimed is:

1. A screen device which is a light-transmitting screen device, comprising:
an electrically conductive mesh pattern that is formed on a film-shaped transparent substrate so as to enable at least one of touch input and electromagnetic wave shielding, wherein
the mesh pattern consists of a plurality of irregular polygons arranged along an upper surface of the transparent substrate,
a pitch value of each of the plurality of irregular polygons is included within a preset range, and
pitch values of respective neighboring irregular polygons are different from each other, wherein
in the irregular polygon, distance values between vertices are different from each other, and
in the irregular polygon, angles formed by neighboring sides around each vertex are different from each other, wherein
the number of vertices of the irregular polygon is four or more, and directions in which respective sides of the irregular polygon extend are different from each other, wherein the mesh pattern comprises a plurality of unit mesh blocks arranged in an array form, and the plurality of unit mesh blocks are connected to each other into the electrically conductive mesh pattern at the outermost parts thereof, and
extension directions of the sides of the irregular polygon, which forms a boundary between the unit mesh blocks at the outermost part of each of the plurality of unit mesh blocks, are different from each other so that the boundary between the unit mesh blocks is prevented from being visually recognized, wherein
the pitch value of each of the plurality of irregular polygons is determined such that a light transmittance of the mesh pattern is 80% or more and a sheet resistance of the mesh pattern is 10 $\Omega/cm^2$ or less.

2. The screen device of claim 1, wherein
the pitch values of the plurality of irregular polygons are distributed within a range of 70% to 130% of a magnitude of a reference pitch value, and
the reference pitch value is any one value selected from 100 to 500 micrometers.

3. The screen device of claim 1, wherein
the pitch values of the plurality of irregular polygons are distributed within a range of 245 to 455 micrometers, 280 to 520 micrometers, 315 to 585 micrometers, or 350 to 650 micrometers.

4. The screen device of claim 1, wherein
a concave groove is formed in a shape of the mesh pattern on the upper surface of the transparent substrate, and
the mesh pattern is formed along the groove, wherein
the plurality of irregular polygons comprise a plurality of mesh lines, and
each of a width and a depth of the mesh line is within a range of 4 to 10 micrometers.

5. The screen device of claim 1, wherein
shapes and sizes of the irregular polygons forming a boundary between the unit mesh blocks at the outermost part of each of the plurality of unit mesh blocks are different from each other, wherein
the plurality of unit mesh blocks have a size of 5 cm×5 cm or less, and include a rectangular shape.

6. The screen device of claim 1, wherein
in the mesh pattern, a plurality of disconnection lines are formed to separate and partition a plurality of channels each of which is capable of conducting electricity such that the plurality of channels are formed.

* * * * *